United States Patent
Sun et al.

(10) Patent No.: US 12,494,150 B2
(45) Date of Patent: Dec. 9, 2025

(54) COLOR-PERCEPTION-GUIDED DISPLAY POWER REDUCTION FOR EXTENDED REALITY

(71) Applicants: University of Rochester, Rochester, NY (US); New York University, New York, NY (US)

(72) Inventors: Qi Sun, New York, NY (US); Yuhao Zhu, Rochester, NY (US); Budmonde Duinkharjav, Long Island City, NY (US); Kenneth Chen, New York, NY (US); Abhishek Tyagi, Rochester, NY (US); Jiayi He, Rochester, NY (US)

(73) Assignees: University of Rochester, Rochester, NY (US); New York University, New York, NY (US)

( * ) Notice: Subject to any disclaimer, the term of this patent is extended or adjusted under 35 U.S.C. 154(b) by 0 days.

(21) Appl. No.: 18/884,530

(22) Filed: Sep. 13, 2024

(65) Prior Publication Data
US 2025/0095532 A1    Mar. 20, 2025

Related U.S. Application Data

(60) Provisional application No. 63/583,034, filed on Sep. 15, 2023, provisional application No. 63/583,017, filed on Sep. 15, 2023.

(51) Int. Cl.
G09G 5/391 (2006.01)
G06F 3/01 (2006.01)
G06T 7/90 (2017.01)
G06T 11/00 (2006.01)
G09G 3/20 (2006.01)

(52) U.S. Cl.
CPC .......... *G09G 3/2007* (2013.01); *G06F 3/013* (2013.01); *G06T 7/90* (2017.01); *G06T 11/001* (2013.01); *G09G 2330/021* (2013.01)

(58) Field of Classification Search
CPC .. G09G 3/2007; G09G 2330/021; G06T 7/90; G06T 11/001; G06F 3/013; G03H 1/2294
USPC ........................................................ 345/428
See application file for complete search history.

(56) References Cited

U.S. PATENT DOCUMENTS

2016/0379606 A1* 12/2016 Kollin ................. G03H 1/2294
                                                           345/428

* cited by examiner

*Primary Examiner* — Abdul-Samad A Adediran
(74) *Attorney, Agent, or Firm* — Kilpatrick Townsend & Stockton LLP

(57) ABSTRACT

Saving power in an extended-reality device can include rendering a video stream on a display, tracking an eye of a user observing the display, ascertaining a gaze direction of the eye based on tracking the eye, calculating a foveal region of the display based on ascertaining the gaze direction in relation to the display, and modulating color hues of the video stream for pixels of the display outside the foveal region, to reduce a power consumption of the display. Modulating color hues is based on human color discrimination and display power consumption correlated to pixel color.

20 Claims, 8 Drawing Sheets

COLOR-PERCEPTION-GUIDED DISPLAY POWER REDUCTION FOR EXTENDED REALITY

CROSS-REFERENCE TO RELATED APPLICATIONS

This application claims priority to U.S. Provisional Patent Application No. 63/583,034, filed on Sep. 15, 2023, and U.S. Provisional Patent Application No. 63/583,017, filed on Sep. 15, 2023, the disclosures of which are incorporated by reference in their entirety for all purposes.

The following two U.S. Patent Applications, including this one, are being filed concurrently, and the entire disclosure of the other application is incorporated by reference into this application for all purposes:

U.S. patent application Ser. No. 18/884,530, filed Sep. 13, 2024, entitled "COLOR-PERCEPTION-GUIDED DISPLAY POWER REDUCTION FOR EXTENDED REALITY"; and U.S. patent application Ser. No. 18/884,550, filed Sep. 13, 2024, entitled "HUMAN COLOR DISCRIMINATION FOR MEMORY-EFFICIENT ENCODING IN EXTENDED REALITY."

STATEMENT REGARDING FEDERALLY SPONSORED RESEARCH OR DEVELOPMENT

This invention was made with government support under CNS2225860, CNS2225861, and CCF2044963 awarded by the National Science Foundation. The government has certain rights in the invention.

BACKGROUND

Battery life is an increasingly urgent challenge for today's untethered virtual-reality and augmented-reality devices. However, the power efficiency of head-mounted displays is naturally at odds with growing computational requirements driven by better resolution, refresh rate, and dynamic ranges, all of which reduce the sustained usage time of untethered virtual-reality and augmented-reality devices. There is a need for further power-savings features for virtual-reality and augmented-reality devices.

BRIEF SUMMARY

In some configurations, a system for power savings in an extended-reality device comprises: a head-mounted device comprising a display and an eye-tracking system; and one or more memory devices comprising instructions that, when executed by one or more processors, causes the one or more processors to perform the following steps: rendering a video stream on the display, tracking an eye of a user observing the display, ascertaining a gaze direction of the eye, based on tracking the eye, calculating a foveal region of the display, based on ascertaining the gaze direction in relation to the display, and/or modulating color hues of the video stream for pixels of the display outside the foveal region, to reduce a power consumption of the display. Modulating is based on a computational model of human color discrimination and a power model that correlates power consumption with pixel color. In some embodiments, the instructions, when executed, further cause the one or more processors to modulate intensity of the display outside the foveal region to further reduce power consumption of the display; modulating colors green shifts light for a plurality of pixels; modulating color hues uses a constrained convex optimization that reduces display power while ensuring color hues are within a human discrimination threshold of the computational model of human color discrimination; and/or hues of pixels within a 10-degree cone centered on the gaze direction are not modulated.

In some configurations, a method, for power savings in an extended-reality device, comprises rendering a video stream on a display; tracking an eye of a user observing the display; ascertaining a gaze direction of the eye, based on tracking the eye; calculating a foveal region of the display, based on ascertaining the gaze direction in relation to the display; and/or modulating color hues of the video stream for pixels of the display outside the foveal region, to reduce a power consumption of the display, based on a computational model of human color discrimination and a power model that correlates power consumption with pixel color. In some embodiments, modulating color hues is performed in real time based on learned data sets; modulating color hues is based on a power optimization routing using an intermediate color space that is a linear transformation of LMS color space; modulating colors red shifts light for a plurality of pixels; modulating color hues uses a constrained convex optimization that reduces display power while ensuring color hues are within a human discrimination threshold of the computational model of human color discrimination; and/or hues of pixels within a 5-degree cone centered on the gaze direction are not modulated.

In some configurations, a memory device comprises instructions that, when executed by one or more processors, causes the one or more processors to perform the following steps: rendering a video stream on a display; receiving a gaze direction of an eye of a user observing the display based on tracking the eye of the user; calculating a foveal region of the display, based on the gaze direction in relation to the display; and/or modulating color hues of the video stream for pixels of the display outside the foveal region, to reduce a power consumption of the display, based on a computational model of human color discrimination and a power model that correlates power consumption with pixel color. In some embodiments, the instructions, when executed, further cause the one or more processors to modulate intensity of the display outside the foveal region to further reduce power consumption of the display; modulating color hues is performed in real time based on learned data sets; color hues are modulated based on reference colors of pixels; modulating color hues is based on a power optimization routing using an intermediate color space that is a linear transformation of LMS color space; modulating colors green shifts light for a plurality of pixels; modulating color hues uses a constrained convex optimization that reduces display power while ensuring color hues are within a human discrimination threshold of the computational model of human color discrimination; hues of pixels within a 10-degree cone centered on the gaze direction are not modulated; and/or hues of pixels outside 35 degrees of the gaze direction are modulated similarly as pixels at 35-degrees.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
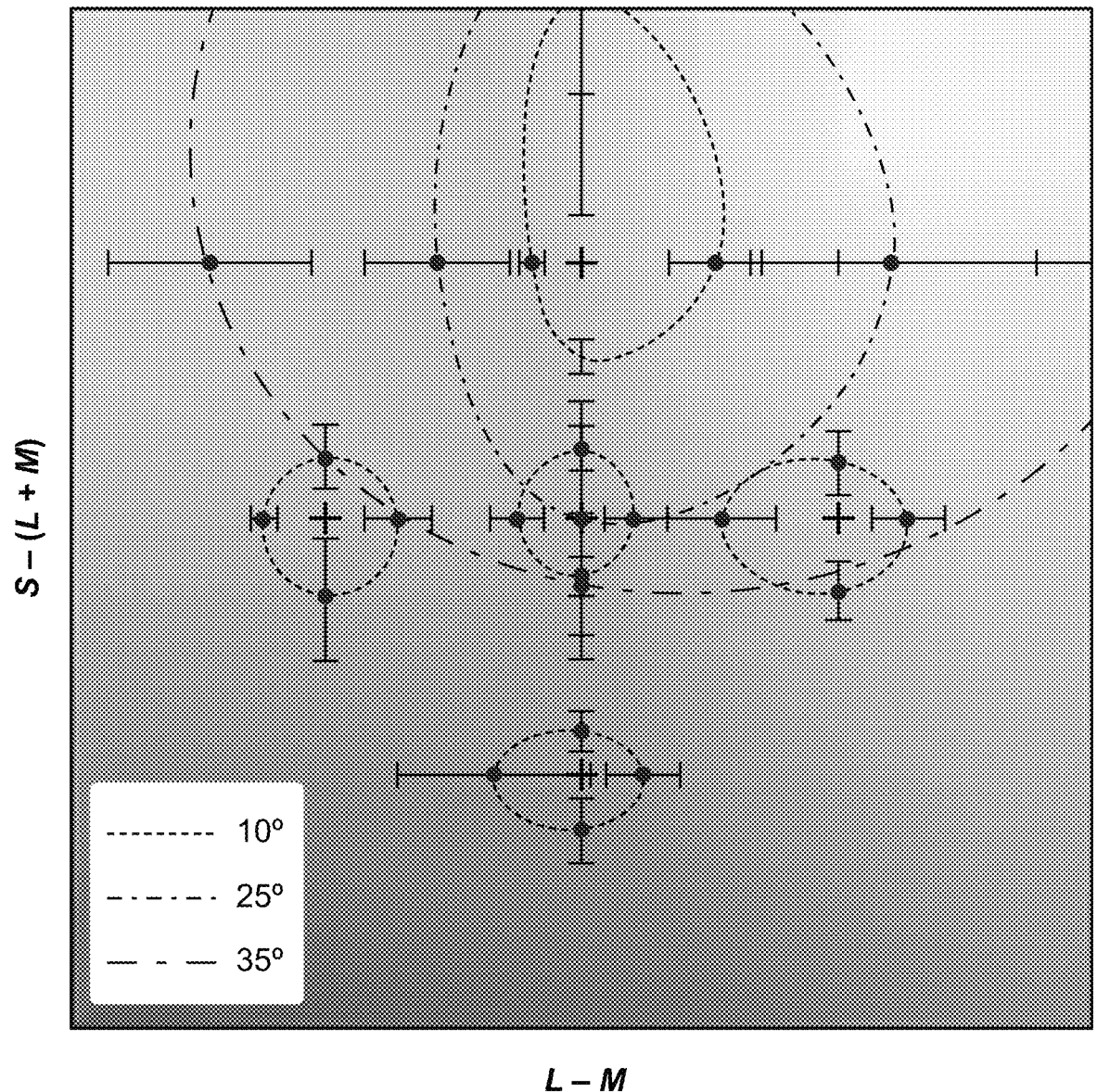
FIG. 1 depicts results of a study for color discrimination threshold

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The present disclosure relates to power savings, and more particularly and without limitation relates to power savings in extended-reality devices. Extended Reality (XR) is an umbrella term that includes technologies that alter reality by presenting graphical elements on a display in relation to a person or a real-world environment. XR includes, and is not limited to, Virtual Reality (VR), Augmented Reality (AR), and Mixed Reality (MR) technologies.

As mentioned in the Background, battery life can be a challenge for some XR technologies, particularly head-mounted devices. Directly applying some smartphone display power reduction techniques, however, can degrade the visual perception in some XR displays, with noticeable artifacts. For instance, the "power-saving modes" on some smartphones uniformly lowers the pixel luminance across the display and, as a result, presents an overall darkened visual perception to users if directly applied to XR content.

In some configurations, a gaze-contingent system is described that, without degrading luminance, reduces or minimizes the display power consumption while preserving high visual fidelity when a user actively views immersive video sequences. In some configurations, this is done using 1) a gaze-contingent color discrimination model through psychophysical studies, and 2) a display power model with respect to pixel color (e.g., from real-device measurements). An algorithm can be cast as a constrained optimization problem with a closed-form solution, which can be implemented as a real-time, image-space shader. Experiment results of some embodiments show display power can be reduced by 24% with little to no perceptual fidelity degradation.

1. Introduction

XR devices are increasingly becoming untethered for portability, outdoor usage, and unrestricted locomotion to enable ultimate immersion. At the same time, the demands for higher resolution, framerate, and dynamic range are steadily increasing, which is directly at odds with the limited energy capacity of untethered AR/VR devices. Power consumption can be a concern in the design of some XR devices. Many conventional display power optimizations are geared toward smartphone displays, which, when directly applied to other XR devices, can lead to significant visual quality degradation. This is because smartphone display optimizations are fundamentally gaze-agnostic. Classic gaze-contingent optimizations in AR/VR, such as foveated rendering, while reducing the rendering load do not directly reduce the display power.

In some configurations, a gaze-contingent rendering approach is used that reduces power consumption of XR displays while preserving visual quality during active viewing. This is achieved by modulating the chromaticity of the display output (e.g., with or without changing luminance). Given an original frame, such as in a 360 video, a computational model that guides a gaze-contingent color "shift" is implemented that (1) reduces a power cost, and (2) preserves perceived fidelity.

To accomplish this, two studies were conducted. First, we quantitatively modeled how color sensitivity degrades with higher retinal eccentricities. Second, we physically measured LED display power consumption as a function of the displayed color. Given the perceptual and the power model, a system can perform a constrained optimization that identifies, for each pixel, an alternative color that reduces power consumption while maintaining perceptual quality. The optimization problem can be a closed-form solution (e.g., because of some design decisions made in constructing the perceptual and power models). Perception-preserving color modulation can be implemented as a real-time shader.

2. Related Work 2.1 Energy-Aware Graphics and Display

The graphics rendering pipeline uses heavy computation to execute in real-time. Reliably maintaining the performance requirements of these applications consumes considerable power. As such, energy-aware methods have been developed to reduce rendering power while maintaining rendering quality. Complementary to reducing rendering power, some embodiments reduce display power by modulating the display color while preserving perceptual fidelity.

Other work focuses on reducing the display power by modulating the brightness/luminance of the display rather than color. Our work on color modulation is orthogonal and complementary to luminance-modulating techniques. We show that significant power saving is readily obtainable by adjusting only color. Combining color and luminance modulation can lead to higher power savings. Another orthogonal line of work is to reduce OLED power via better hardware design.

2.2 Perceptually-Aware Immersive Rendering

The human eye's ability to receive and process light signals deteriorates for stimuli located at higher retinal eccentricities, due to the significantly denser distribution of retinal cone cells in the fovea and the significantly higher degree of neural convergence in the periphery. Foveated rendering takes advantage of the drop in visual acuity as retinal eccentricity increases by reducing image quality in the periphery, which can improve performance while maintaining perceptual.

2.3 Visual Perception of Displayed Color

The CIE XYZ color space has since become a cornerstone of modern color research, because it presents a hardware/device-independent way of quantifying colors. The sRGB color space widely used in graphics, display, and vision fields today is derived from the XYZ color space. The sRGB color space, however, is rarely directly used in color perception studies, because sRGB is a device-dependent color space with non-uniform quantization and has a gamut smaller than the gamut of the human visual system. Color perception studies usually operate on some form of physiologically-based LMS color spaces. The DKL color space leverages a cone-opponent mechanism to derive a physiologically-relevant and perceptually uniform color space. Our perceptual study was based on the DKL color space.

Human color perception exhibits eccentricity effects. For instance, given a reference color, our discrimination thresholds are observed to have the shape of an ellipse in DKL space, and this region of sub-threshold colors increases significantly as the retinal eccentricity of stimuli increases.

Color sensitivity can be correlated to human status and/or task nature. For instance, the color sensitivity during fixation shifting (i.e., saccade) decrease. Some configurations focus on active viewing scenarios, which are representative conditions of some XR applications, such as VR/AR gaming and video-watching.

3. Eccentricity Effects on Color Perception

We studied how human perception of color varies across the visual field, so that we can adjust the appearance of visual stimuli in our peripheral vision in an advantageous way. The human eye still maintains the ability to discriminate colors at significantly high retinal eccentricities. We designed and performed a psychophysical study on the perceptual discrimination thresholds of colors, given various reference colors and retinal eccentricities from 10 degrees to 35 degrees. The experimental data was used to create a computational model.

Further details of the study can be found in Budmonde Duinkharjav, et al., "Color-Perception-Guided Display Power Reduction for Virtual Reality," ACM Trans. Graph., Vol. 41, No. 6, Article 21, December 2022, which in incorporated by reference for all purposes.

FIG. 1 depicts results of a study for color discrimination threshold. The S−(L+M) and L−M axes are axes in the DKL color-space, which compares the difference between S vs L+M and L vs M cone activations. As we approached a reference color from four directions in DKL space, we obtained four different thresholds for each color at each eccentricity. Lines connecting four thresholds do not represent the shape of the overall threshold, and is only served as a visual guide to group each set of thresholds together. The black crosses indicate 5 sampled reference/pedestal colors in DKL space. Experimental thresholds are displayed with dots as mean, and bars as 75% confidence intervals. To avoid visual clutter, plot discrimination thresholds at 10 degrees eccentricity for each reference color and 10 degrees, 25 degrees, and 35 degrees eccentricity thresholds for one reference. Splines (dashed gray lines) are for ease of visualization only.

We chose the DKL color-space as our color sampling space primarily because prior work suggests that the DKL color space yields a perceptually uniform sampling space. For our work, we only sampled colors on a single equiluminant plane. In DKL space, this corresponds to keeping the third dimension of the color space constant. We observed unequal thresholds with different reference colors even if they were displayed at the same eccentricity. However, they all appeared an ellipse shape. A computational perceptual model was developed considering the reference color as one of the inputs. Our experimental data provides thresholds for a stimulus with a dominant frequency equal to 0.2 cpd corresponding to the stimulus size used throughout the experiment. Our data shows a decrease of ability to discriminate chromatic discrepancies as the retinal eccentricity increases. FIG. 1 shows that the fall-off of discriminative sensitivity is very sharp, and the region of sub-threshold chromaticities at 35 degrees can take up as much as a third of the observable hues. Some participants in the study noted that at high eccentricities, all four disks appeared to be different, even though three of the disks were colored identically. As such, the amount of noisy thresholds at high eccentricities attribute to the larger uncertainty for the overall threshold measurements as shown in FIG. 1.

We also observed inter-subject variation in the measured thresholds. For developing a computational model, we use the most conservative thresholds across participants, instead of an average fit. This assures generalization to a larger population considering individual variances.

The thresholds in FIG. 1 hold for discriminative tasks. Using the observed thresholds, we performed preliminary validation with a sequential detection task and two-alternative-forced choice (2AFC). In this study, the same group of participants was instructed to observe pairs of stimuli and identify whether they appear identical. Some of the trials consist of one non-altered image, with the other containing peripheral color altering within the identified thresholds. We observed that a majority of users can successfully identify the altered condition, suggesting the distinct perceptual thresholds between discrimination and detection tasks.

4. Measuring Display Power with Varied Colors

To measure the power consumption characteristics of a VR display and how it varies depending on the images displayed on them, we conduct a hardware study, and later used the collected data to derive a model for predicting the power consumption of a display given the image displayed on it.

For the power study, the display module had two identical displays, each with a resolution of 1080×1200, matching the aspect ratio of HTC Vive Pro Eyes, which is what we used for perceptual studies.

Figure 2:
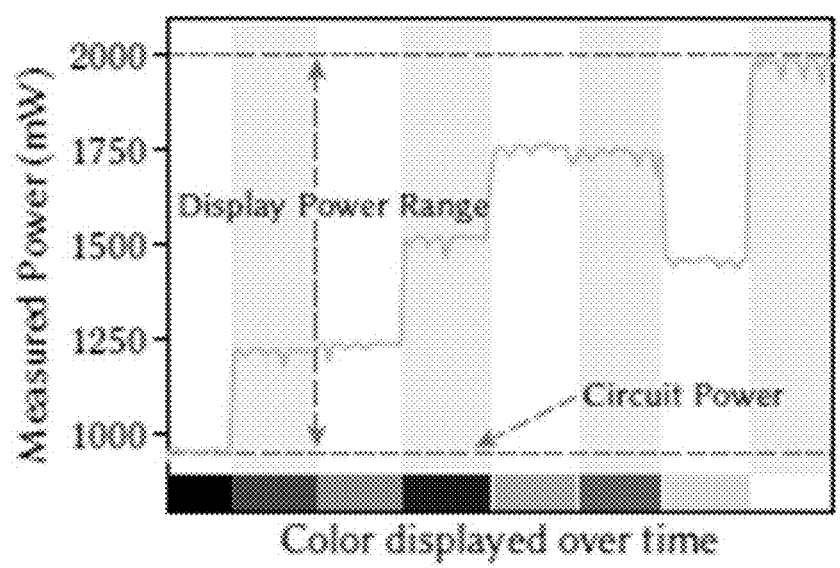
FIG. 2 shows an embodiment of display power measurements

FIG. 2 shows an embodiment of display power measurements. The display power supply was intercepted with a SwitchDoc Power-Central board, which had an on-board INA219 module to measure the current. We developed a driver that runs on the Arduino board to get the display current and voltage, from which we could calculate the power.

We measure the power consumption of eight vertices of the sRGB color cube. For each color, we set all the display pixels to that color, display it for five seconds, and calculate the average power. FIG. 2 shows the measured power trace. It is clear that the display power consumption is sensitive to the color.

We make two observations from FIG. 2. First, even when the display is showing black pixels, i.e., when the LEDs are not emitting light, there is a non-trivial amount of static power consumption. The power beyond the static portion is consumed by the LEDs, which we dub the dynamic display power. This static power is consumed by the peripheral circuitry that drives the LEDs. The contribution of the static power is about 50% in display white and is about 80% when displaying red and green. LED power is hard to reduce because the display must sustain certain luminance levels to meet brightness requirements. Our aim was to reduce the (color-sensitive) dynamic power of the display, which can become more important as the static power reduces in the future.

Second, the dynamic power consumption of red and green colors are roughly half that of blue. This is because displaying the sRGB blue on our display requires contributions from both the blue and red sub-pixels (due to the primaries used by this display). As a result, to expect to see any energy wins, we anticipated that green—and/or red-shifting images can decrease the power consumption of the image. We leveraged the measured data to obtain a computational power-vs-color model

5. Perceptually Guided Power Optimization

Using the results of the perceptual user study (e.g., FIG. 1), and hardware power measurements (e.g., FIG. 2), we developed a display power optimization model under the constraint that the change in the images observed by human subjects is not perceptible.

5.1 Perceptual Model for Color Discrimination

Figure 3:
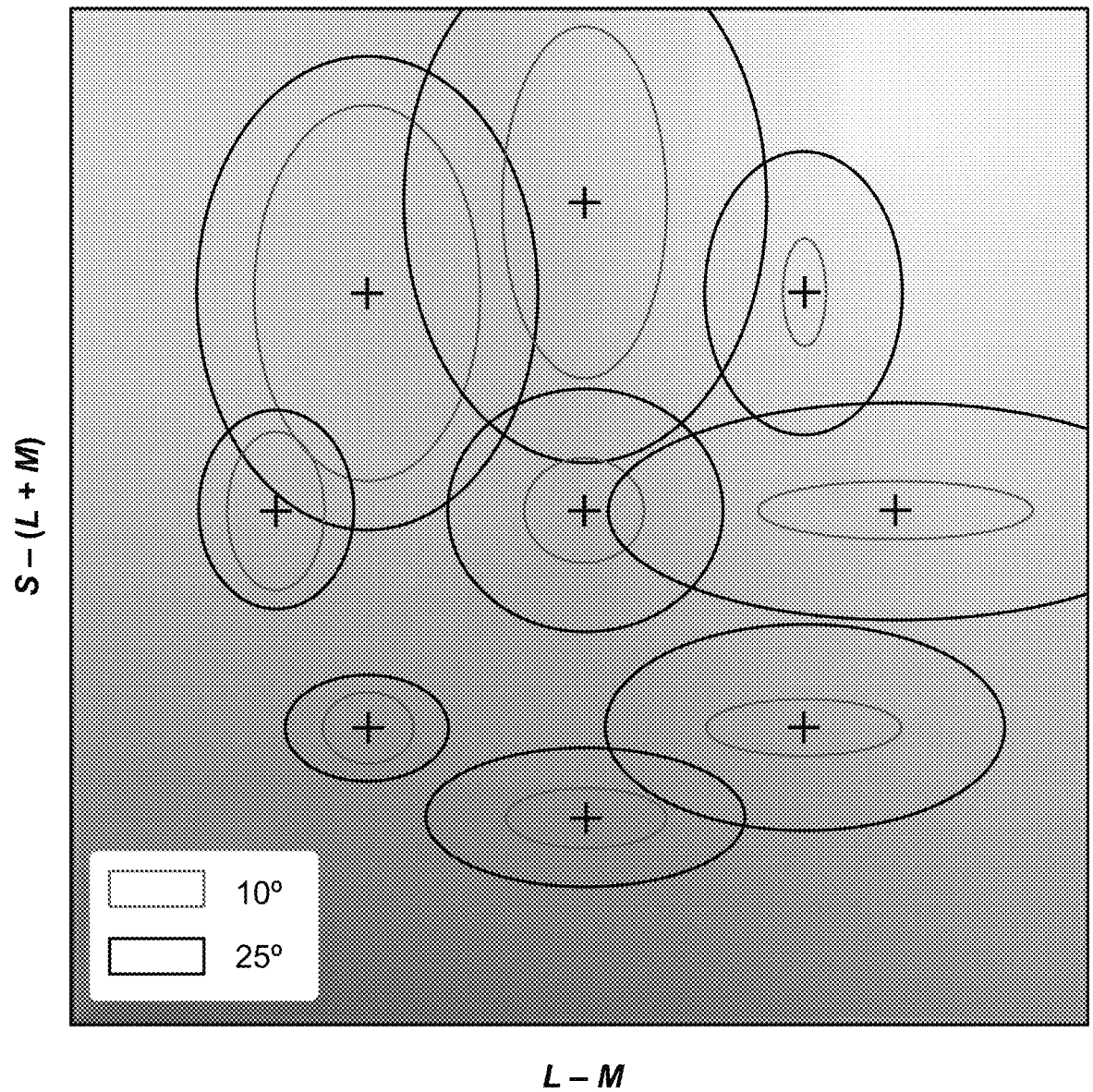
FIG. 3 depicts an embodiment of a computational model of human color discrimination.

FIG. 3 depicts an embodiment of a computational model of human color discrimination. It was derived using the data obtained from Section 3. A linear power consumption model regressed from the physical measurement was built data in Section 4. The computational model of human color discrimination was integrated with the linear power consumption model (e.g., as a constrained convex optimization) toward a closed-form display color modulation function. The display color modulation function reduces (and/or minimizes) the display's power consumption while ensuring the modulation within the human discriminative thresholds. FIG. 3 illustrates the color discrimination model's ellipse thresholds at nine coordinates. They are evaluated on an equiluminant plane in the DKL color space, with eccentricities 10 degrees (light gray curve) and 25 degrees (dark black curve). Colors within an ellipse are perceptually indistinguishable from the center (black-cross) color.

A computational framework that quantifies the discriminative threshold of a given color at different retinal eccentricities was developed. That is, given a colored stimulus at some retinal eccentricity, we determined the extent to which we can modulate its color while maintaining its perceptual color appearance to an observer. The set of colors which are indistinguishable from some test color by human observers were modeled as ellipse shaped regions.

DKL color space. DKL space defines colors in two steps. It quantifies a color using the cone-opponent mechanism. Therefore, a color is first defined over a basis that computes the cone-opponent neural activations. Namely, a color with LMS coordinates ($t_L$, $t_M$, $t_S$) is first converted to the basis (Equation 1):

$$t_{L-M} = t_L - t_M$$
$$t_{S-(L+M)} = t_S - (t_L + t_M)$$
$$t_{L+M} = t_L + t_M,$$

Instead of directly using the cone-opponent basis, the DKL space models colors in terms of color contrast; that is, colors are defined relative to a reference (i.e., the adaptation) color. This is different from the more absolute measure of color used in sRGB, XYZ, and LMS color spaces, where each color is defined based on its own characteristics.

Specifically, given a test color, t, and an adaptation color, b, the color-contrast of the test color can be computed with respect to the adaptation color as (Equation 2):

$$\kappa(t_i; b_i) = \frac{t_i - b_i}{b_i}, \text{ for } i \in \{1, 2, 3\}.$$

Depending on the specific basis used to represent these colors, the indices {1, 2, 3} could be {X,Y, Z} for the XYZ basis or {L,M, S} for the LMS basis. In our case, the indices {1, 2, 3} are {L–M, S–(L+M), L+M}, since we have already defined colors in the cone-opponent space, as shown in Equation (1). Equation (1) can be seen as producing an intermediate color space that is a linear transformation away from the conventional LMS space. We refer to the intermediate color space given by Equation (1) as i (intermediate)-DKL.

The LMS cone fundamentals are defined so that the coordinate $t_{L+M}$ of a color is equal to the luminance of the color (e.g., the Y coordinate in the XYZ space).

Modeling ellipse level sets. In the sample model, we represent the set of equiluminant colors which cannot be discriminated from a test color, t ∈ i-DKL, relative an adaptation color, b ∈ i-DKL, using an ellipse-shaped region centered around the color contrast of the test color. The boundary of this ellipse region corresponds to the discriminative threshold of $\kappa(t_i, b_i)$, for i ∈ {L–M, S–(L+M)}. The set of color coordinates which represent this threshold, x ∈ i-DKL, fulfill the system of equations (Equation 3):

$$\begin{cases} x_{L+M} = b_{L+M} \\ \mathcal{E}(x; t, b, \alpha) = 0 \end{cases}.$$

The first constraint ensures that the color coordinates on the threshold are equiluminant to the adaptation color. The second constraint ensures that x are on the edge of the ellipse region with major and minor semi-axes equal to $\alpha=(\alpha_{L-M}, \alpha_{S-(L+M)}) \in R^2$. Formally, the function E(·) is defined as (Equation 4):

$$\mathcal{E}(x; t, b, \alpha) = \sum_{i=\{L-M, S-(L+M)\}} \left( \frac{\kappa(x_i; b_i) - \kappa(t_i; b_i)}{\alpha_i} \right)^2 - 1,$$

Model Regression. Equation (4) uses the knowledge of the ellipse-size parameters, $\alpha_i$, which relates to the color-contrasts of various test colors, $\kappa(t_i, b_i)$, as well as the retinal eccentricity, e ∈ $R^+$, at which a colored stimulus is displayed. We leverage user study data from Section 3 to produce the relationship (Equation 5):

$$\Phi: (\kappa, e) \mapsto \alpha$$

where K ∈ $R^2$ are the L–M and S–(L+M) coordinates of the test color in DKL space computed using Equations (1) and (2). Specifically, we use our data to optimize a shallow neural network, which estimates the discrimination thresholds, using least-squares regression (Equation 6):

$$\hat{\alpha} = \underset{\Phi}{\operatorname{argmin}} \|\Phi(\kappa, e) - \alpha\|_2^2.$$

The $R^2$ value of the regression is 0.58 (adjusted $R^2$ value of 0.51), indicated an acceptable regression accuracy. The raw data from Section 3 was pre-processed. Our aim was to cover more conservative thresholds that are generalizable to broad users instead of an "average fit."

Neural Network Architecture. We chose the Radial Basis Function Neural Network (RBFNN) with a sigmoid output layer to ensure local smoothness, as well as a positive, localized output range. Mathematically, the network is summarized as (Equation 7):

$$\Phi(\kappa, e) = \eta \odot S\left(\sum_{j=1}^{N} \lambda_j \rho\left(\left\|\begin{bmatrix}\kappa\\e\end{bmatrix} - c_j\right\|_2, \sigma_j\right) + v_j\right),$$

where $\odot$ is the term-wise multiplication operator. The RBFNN takes the input, and computes the weights of the effect each of the N nodes of the latent representation have on the input. It does so by applying a Gaussian Radial Basis function, $\rho$, centered at $c_j$ with std of $\sigma_j$, for each node, j. The weights of each node is scaled by a scaling constant $\lambda_j$, incremented by the linear bias $v_j$, summed up, and passed to the sigmoid function S and multiplied by a scaling factor $\eta$ to produce the final prediction. The trainable parameters of this network are the centers, $c_j$, sizes, $\sigma_j$ of the radial bases, as well as the final scaling factors $\lambda_j$, and linear biases $v_j$. $\eta$ is a normalization constant and chosen to be the maximum possible value of contrasts within the capability of the display used, and hence does not change. We kept the number of nodes N=5 low to maintain smoothness of the outputs.

Ellipse re-parameterization. Since the adaptation color, b, is the same for variables in Eq. (4), we simplify the function by reparameterization as $\alpha_i = \alpha_i b_i$ for $i \in \{L-M, S-(L+M)\}$ (Equation 8):

$$\mathcal{E}(x; t, a) = \sum_{i=\{L-M, S-(L+M)\}} \left(\frac{x_i - t_i}{a_i}\right)^2 - 1.$$

While the original formulation in Equation (4) relates the ellipse to variables in DKL space, and are ultimately the variables used to regress the model, it can be helpful to reformulate the model with respect to the differences of color in i-DKL: x-t, as well as the new parameter, a, which represents the size of the ellipse in i-DKL space, are both measures defined within i-DKL. In summary, Equation (8) converts Equation (4) from a DKL space parameterization to a i-DKL parameterization.

5.2 Power Model for Display Illumination

We derived a computation model that correlates an OLED's power consumption with the pixel color. The display power is modeled as the sum of the LED power, which includes powers of its three sub-pixels and the power of the peripheral circuitry. The power of an OLED sub-pixel is roughly proportional to its current. Given the RGB value of the three sub-pixels, $X_{disp} \in$ disp-RGB (i.e., the pixel value in the display native color space), its total power consumption is (Equation 9):

$$\mathcal{P} = \left(\sum_{i=\{1,2,3\}} p_i x_i\right) + p_{circ} = p_{disp}^T x_{disp} + p_{circ},$$

where $p_{disp} \in R^3$ is the vector of unit powers of each sub-pixel, and $p_{circ} \in R$ is the static power consumption (consumed by the peripheral circuits) when all the pixels are black, i.e., the LEDs do not emit light and, thus, do not consume power.

In some applications, it can be challenging to use the display's native color space because it varies depending on the manufacturer specifications, and could be unknown. Color-spaces that are commonly used, such as (linear) sRGB, can transform to a display's native color-space via some linear transformation, $M \in R^{3\times3}$. Using this transformation, we can rewrite Equation (9) in terms of the (linear) sRGB pixels as (Equation 10):

$$\mathcal{P}(x_{srgb}) = p_{disp}^T M_{srgb2disp} x_{srgb} + p_{circ}$$
$$= p_{srgb}^T x_{srgb} + p_{circ},$$

where $M_{srgb2disp}$ is the transformation matrix from (linear) sRGB's color-space to the display's, and $X_{srgb} \in$ sRGB denotes the pixel color in linear sRGB space. For convenience, we define $p^T_{srgb} = p^T_{disp} M_{srgb2disp}$, which denotes the power consumption of the three display sub-pixels under unit sRGB stimuli.

$p_{srgb}$ depends on the specification of a particular display. We study an OLED display module from Wisecoco that has two 1080×1200 displays. The methodology described herein is not unique to the specific display and, thus, can be extended to build power models for any other displays.

Power model regression. To build an analytical power model, we calculated $p_{srgb}$ by physically measuring the power consumption of 52 randomly sampled colors in the sRGB space, including the eight colors that correspond to the eight vertices of the sRGB color cube, as described in Section 4, and solving an over-determined linear system (Equation 11), $$\mathcal{P}^{(color)} = p_{srgb}^T x_{srgb}^{(color)} = p_{circ},$$

where color is the 52 sampled colors, via a linear least squares method.

5.3 Optimizing Display Energy Consumption under Perceptual Constraints

Using Equations (3) and Equation (10), we can minimize the power consumption function of a display, P(x), while constrained within the perceptual limits set by (x). Qualitatively, the power function is a linear function of the input, x, so the minimizing power will be on the surface of the discriminative threshold ellipse (as opposed to its interior). It is more convenient to use the definition of the ellipses in i-DKL space, instead of the DKL space definition (cf. Eq. (8) and Eq. (4)) because the i-DKL space is only a linear transformation away from (linear) sRGB, therefore making its energy computations a lot simpler. Formally, we define the optimization process as (Equation 12):

$$x_{idkl}^* = \underset{x_{idkl}}{\mathrm{argmin}} \mathcal{P}(M_{idkl2srgb} x_{idkl})$$

subject to: $\mathcal{E}(x_{idkl}; t_{idkl}, a = \alpha \odot b_{idkl}) = 0,$ where the original color of the pixel is t and, the adaptation color of the display is b. In our work we choose b to be equal to a color with a chromaticity equal to the CIE D65 Standard Illuminant (i.e., the reference white in the sRGB color space) and a luminance equal to the luminance of the test pixel t.

Due to the convexity of both the cost and constraint functions, we can apply the method of Lagrange multipliers to find the output color, X*srgb, which minimizes the total power consumption in closed form (Equation 13):

$$x^*_{srgb} = M_{idkl2srgb} \begin{bmatrix} \frac{p_1 a_1^2}{\sqrt{p_1^2 a_1^2 + p_2^2 a_2^2}} \\ \frac{p_2 a_2^2}{\sqrt{p_1^2 a_1^2 + p_2^2 a_2^2}} \\ t_3 \end{bmatrix},$$

where {1, 2, 3} correspond to {L–M, S–(L+M), L+M}.

Figure 4:
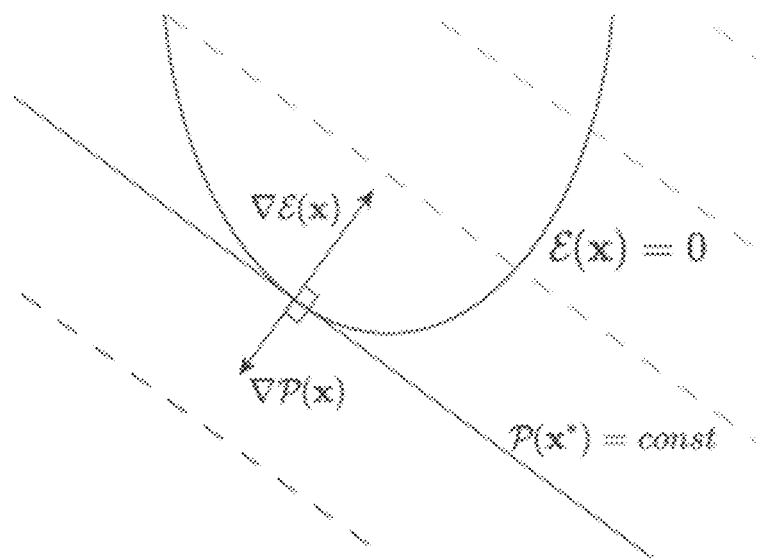
FIG. 4 is an illustration of an embodiment deriving the closed-form and optimal chromaticity.

FIG. 4 is an illustration of an embodiment deriving the closed-form and optimal chromaticity. The color x* which (1) minimizes the first-order power function, P(x); and (2) is under the constraint E(x)=0 when the gradients of both functions are co-linear. The straight lines represent the set of colors consuming the same amount of power. Since the color-spaces sRGB and i-DKL are related via a linear transformation, this solution works in either color-space. FIG. 4 visually illustrates how an optimal color is found using the derivatives of & and P.

6. Implementation 6.1 Perception Study Data Pre-processing

We took two steps to pre-process the perception study data. Both steps were meant to keep the model's threshold estimation conservative, for two reasons. First, there are natural variances across participants, thus a conservative estimation allows the model to generalize to large populations. Second, the model was built to modulate displayed colors to preserve the visual fidelity in active viewing, which we hypothesize to have a lower threshold than that in discriminative tasks. Given a threshold approached from the positive L–M side, a L–M, and one from the negative L–M side, a L–M, the discrimination threshold we picked for model regression was (Equation 14):

$$a_{L-M} = \min(\alpha^+_{L-M}, \alpha^-_{L-M}),$$

and similarly for the S–(L+M) axis.

6.2 Eccentricity Extrapolation

In the perceptual model regression, we restricted the range of valid input eccentricities to be between 10 degrees and 35 degrees because we had only measured discriminative thresholds within this range of eccentricities. We avoided color-shifting content at eccentricities less than 10 degrees due to the low power-saving payoffs for foveal and parafoveal regions. Meanwhile, eccentricities greater than 35 degrees were clamped down to 35 degrees as a conservative estimate.

6.3 Shader

We implemented a post-processing image-space shader in the Unity ShaderLab language to compute per-pixel power-minimizing color. We tested our shader on the HTC Vive Pro Eye (relevant specs shown below) powered by an NVIDIA RTX3090 GPU, and observed that processing each frame takes less than 11 ms, which resulted in no loss of frames in the displays.

Figure 5:
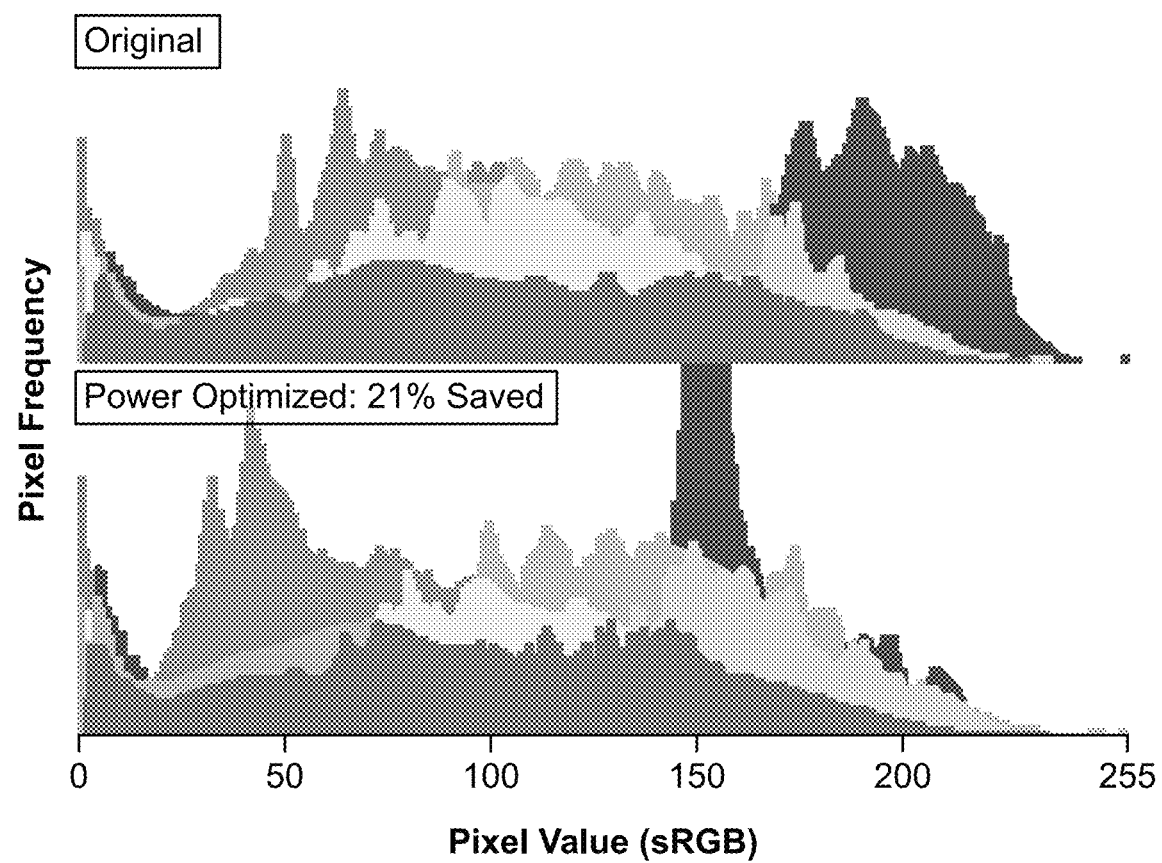
FIG. 5 illustrates an embodiment of histogram changes for an image to visualize how the model shifts the image's chromatic histogram to reduce power consumption.

FIG. 5 illustrates an embodiment of histogram changes for an image to visualize how the model shifts the image's chromatic histogram to reduce power consumption. Blue LEDs consumed more energy than the red/green in our experiment display panel. The gaze-contingent and color-perception-aware display power saving model provides a perceptually-guided, real-time, and closed-form model for minimizing the power consumption of untethered XR displays while preserving visual fidelity. The gaze-contingent shader was applied onto the original image to produce a more power efficient image while preserving the luminance level and perceptual fidelity during active viewing. The histogram for the optimized image is green (and red) shifted to use less blue LEDs because blue LEDs have higher power consumption in the display tested.

7. Example System

Figure 6:
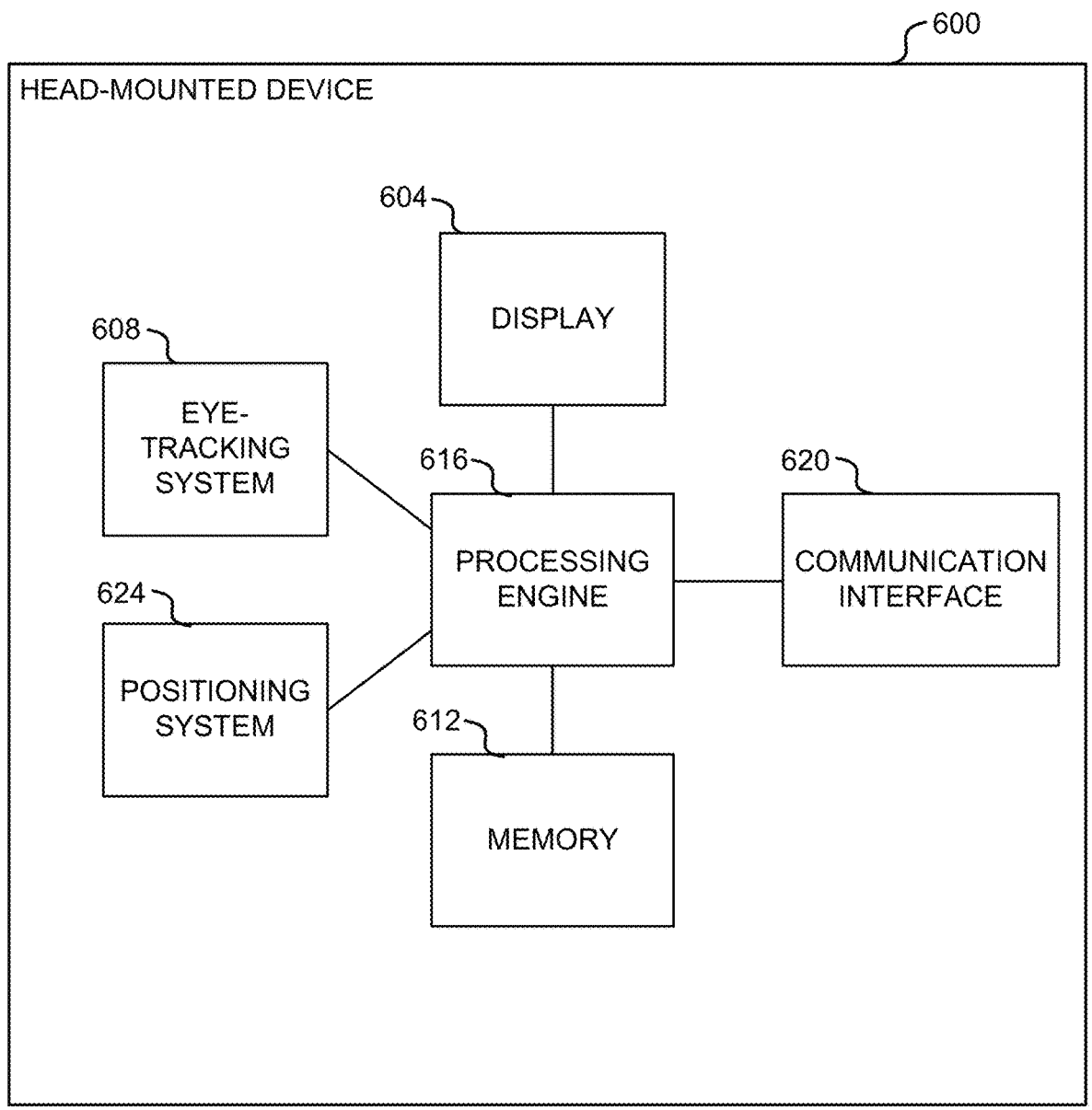
FIG. 6 depicts an embodiment of a head-mounted device.

FIG. 6 depicts an embodiment of a head-mounted device 600. The head-mounted device 600 can be an Extended-Reality (XR) device, such as a Virtual-Reality (VR) device or an Augmented-Reality (AR) device. The head-mounted device 600 is intended to be worn by a user (e.g., a head-mounted display (HMD)).

The head-mounted device 600 comprises a display 604, an eye-tracking system 608, memory 612, a processing engine 615, a communications interface 620, and/or a positioned system 624.

The display 604 is arranged to present a video stream to a user of the head-mounted device 600. The eye-tracking system 608 is arranged to track a gaze direction of the user. The eye-tracking system 608 comprises cameras configured to acquire images of the eyes of the user while the user is viewing the display 604. The eye-tracking system 608 can further comprise one or more IR light sources, optical components, electronics, machine-learning algorithms, etc. for tracking the eyes. The eye-tracking system 608 calculates a gaze direction of the user in relation to the display 604 based on acquiring images of the eyes. The memory 612 comprises one or more memory devices. The one or more memory devices of the memory 612 can be contained in the head-mounted device 600 or be distributed, e.g., between the head-mounted device 600, a base station, and/or one or more remote device (e.g., connected via the Internet or a smart device).

The processing engine 616 comprises one or more processors. Instructions (e.g., code) are stored the memory 612 and, when executed, cause the processing engine 616 to perform one or more steps. The one or more processors 616 can be contained in the head-mounted device 600 or be distributed, e.g., between the head-mounted device 600, the base station, and/or the one or more remote devices (e.g., connected via the Internet or a smart device).

The communication interface 620 can comprise a user interface and/or other devices for communication between the head-mounted device 600 and other devices (e.g., wired or wireless communication with a mobile device, such as a smartphone or tablet, wifi, or the base station).

The positioning system 624 comprises sensors for positioning the head-mounted device 600 with respect to an environment and/or to calculation motion relative to itself. For example, the positioned system 624 can comprise accelerometers that are part of an inertial-measurement unit (IMU), external facing cameras (e.g., for SLAM), and/or processors for receiving position and/or orientation data sent to the head-mounted device 600.

In some configurations, a system for power savings in an extended-reality system comprises a head-mounted device (e.g., head-mounted device 600). The head-mounted device comprises a display (e.g., display 604) and an eye-tracking system (e.g., eye-tracking system 608). The system further comprises one or more memory devices (e.g., memory 612 and/or a memory device on a remote device). The one or more memory devices comprise instructions that, when executed by one or more processors (e.g., processing engine 616), causes the one or more processors to perform the following steps: rendering a video stream on the display; tracking an eye of a user observing the display; ascertaining a gaze direction of the eye, based on tracking the eye; calculating a foveal region of the display, based on ascertaining the gaze direction in relation to the display; and modulating color hues of the video stream for pixels of the display outside the foveal region, to reduce a power consumption of the display. The foveal region of the display can be a region of pixels outside an angle from the gaze direction corresponding to a field of view of the fovea centralis, such as 2 degrees (+/−1 degree from the gaze direction). In some configurations, a conservative estimate is used, such as equal to or less than a 3-, 5-, 7-, 10-, or 12-degree cone centered on the gaze direction is used, and pixels within the cone of the field of view are not modulated. Hue is an attribute of color that permits colors to be classed as red, yellow, green, blue, violet, or an intermediate between two colors. Modulating color hues is based on a computational model of human color discrimination (e.g., as described in section 3) and a power model that correlates power consumption with pixel color (e.g., as described in section 4). Color hues can be modulated based on reference colors of pixels. For example, a video feed could be sending data about images to be displayed. The data about images to be display can include a reference image (or pixel data about hues in the reference image). Color hues in the reference image are changed, outside the foveal area, to conserve power. For example, modulating color hues is based on a power optimization routing using an intermediate color space that is a linear transformation of LMS color space, as discussed in conjunction with Equation 2. Modulating the colors can cause a green—and/or red-shift of at least some of the pixels, as discussed in conjunction with FIG. 5. That is because red and green LEDs consume less power than blue LEDs in the displays measured. Modulating color hues of pixels can use a constrained convex optimization that reduces display power while ensuring color hues are within a human discrimination threshold of the computational model of human color discrimination (e.g., as discussed in section 5).

In some configurations, intensity of light of the display outside the foveal region is modulated to further reduce power consumption of the display. As mentioned in section 2, modulating intensity of pixels can be an orthogonal way to save power.

8. Example Process

Figure 7:
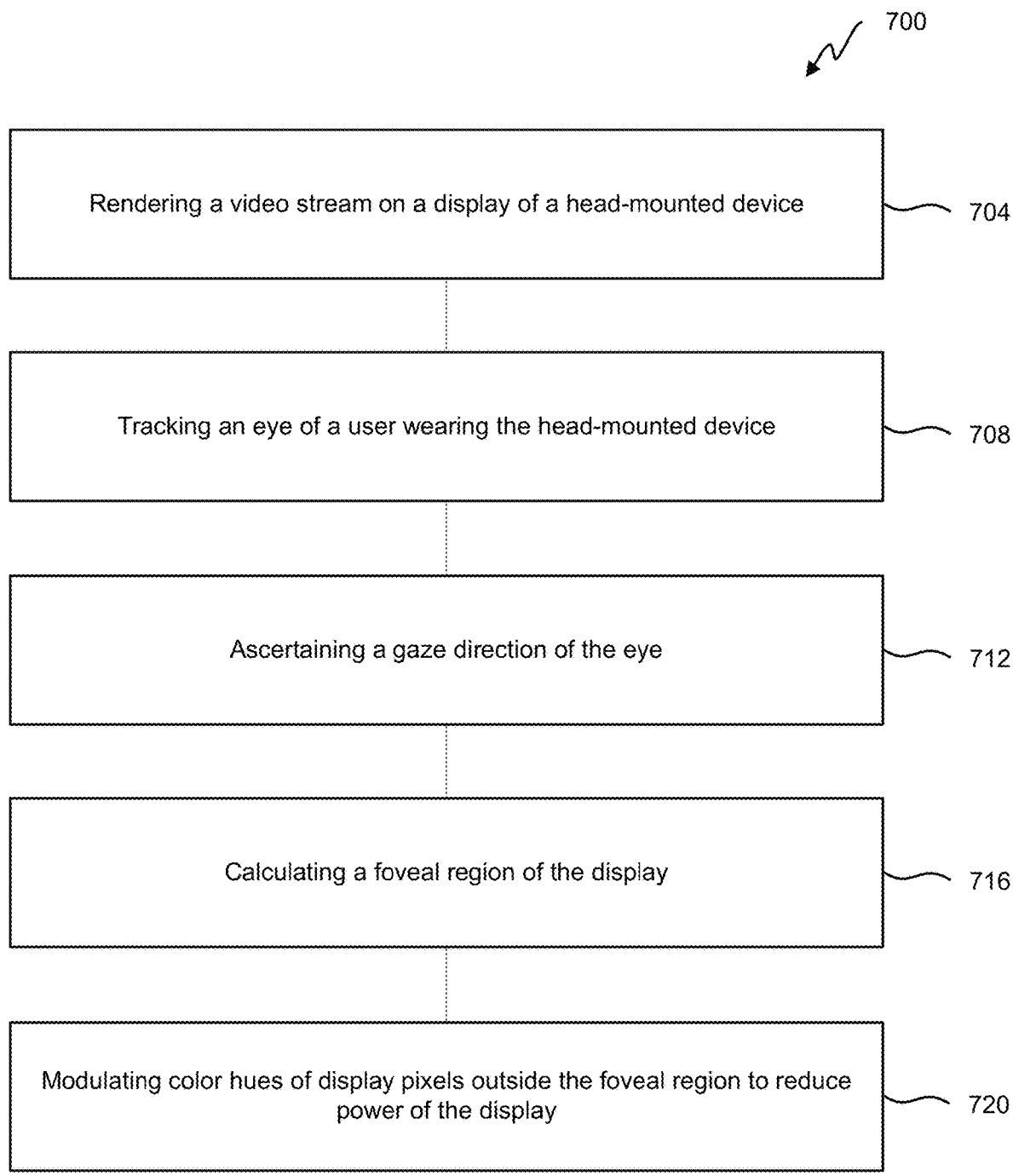
FIG. 7 is a flowchart of an embodiment of a process for power savings in an extended-reality system.

FIG. 7 depicts and embodiment of a process 700 for power savings in an extended-reality system. Process 700 begins in step 704 with rendering a video stream on a display of a head-mounted device. For example, graphics are shown on display 604 in FIG. 6.

In step 708 an eye of the user observing the display of the extended-reality system is tracked, and in step 712, a gaze direction of the eye in relation to the display is ascertained (e.g., calculated) based on tracking the eye. For example, a camera of the eye-tracking system 608 is used to track an orientation of the eye to ascertain where the eye is looking in relation to the display. In some embodiments, data about the gaze direction is received (e.g., from an eye-tracking system). In step 716, a foveal region of the display is calculated (e.g., based on ascertaining the gaze direction of the eye and a position of the eye in relation to the display).

In step 720, color hues of the video stream for pixels of the display outside the foveal region are modulated to reduce a power consumption of the display. Modulation of color hues is based on a computational model of human color discrimination and a power model that correlates power consumption with pixel color.

9. Example Computer System

Figure 8:
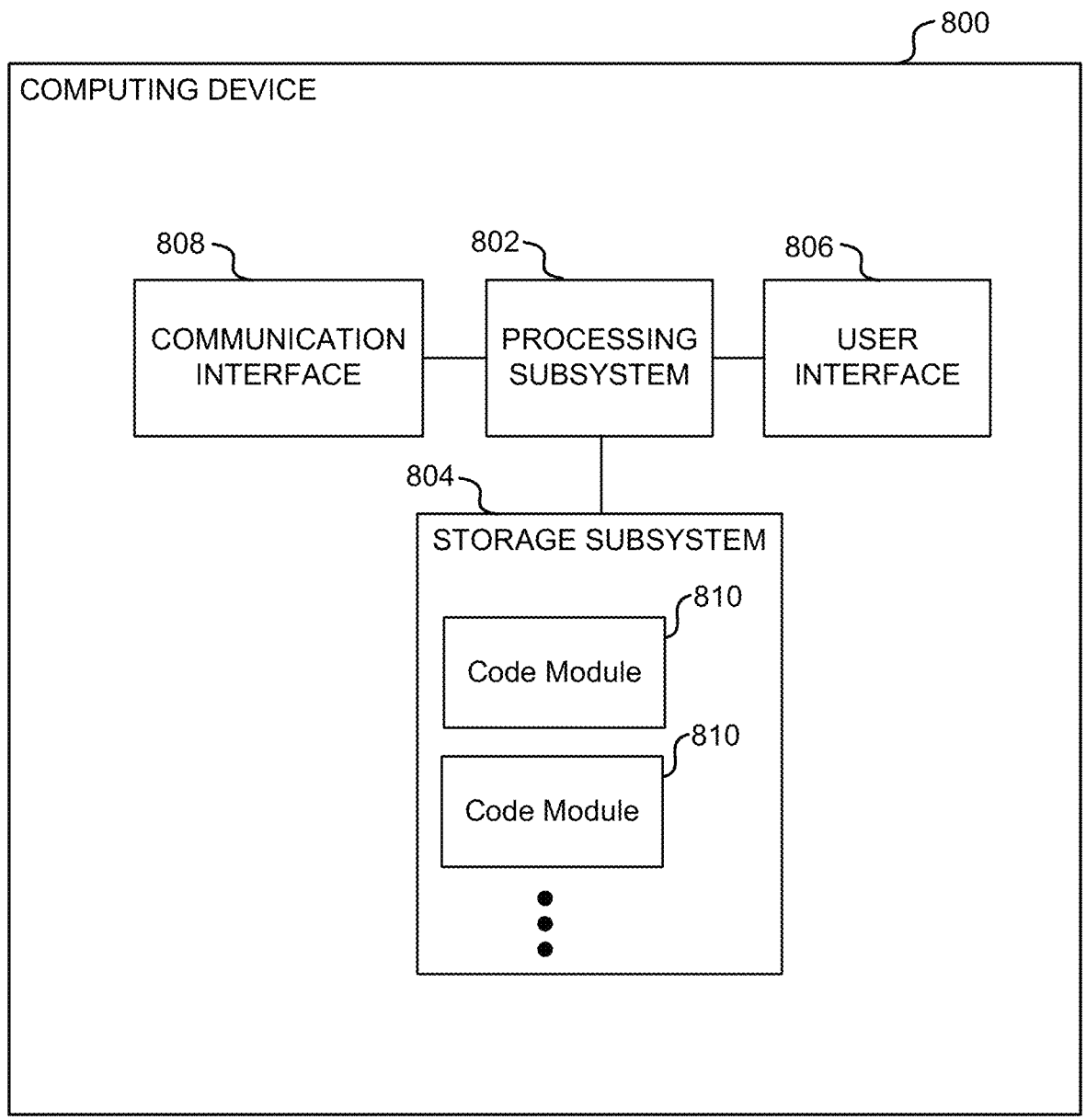
FIG. 8 depicts a block diagram of an embodiment of a computer system.

FIG. 8 is a simplified block diagram of a computing device 800. Computing device 800 can implement some or all functions, behaviors, and/or capabilities described above that would use electronic storage or processing, as well as other functions, behaviors, or capabilities not expressly described. Computing device 800 includes a processing subsystem 802, a storage subsystem 804, a user interface 806, and/or a communication interface 808. Computing device 800 can also include other components (not explicitly shown) such as a battery, power controllers, and other components operable to provide various enhanced capabilities. In various embodiments, computing device 800 can be implemented in a desktop or laptop computer, mobile device (e.g., tablet computer, smart phone, mobile phone), wearable device (e.g., a VR or AR device), media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 804 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 804 can store one or more applications and/or operating system programs to be executed by processing subsystem 802, including programs to implement some or all operations described above that would be performed using a computer. For example, storage subsystem 804 can store one or more code modules 810 for implementing one or more method steps described above.

A firmware and/or software implementation may be implemented with modules (e.g., procedures, functions, and so on). A machine-readable medium tangibly embodying instructions may be used in implementing methodologies described herein. Code modules 810 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module 810) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 810 may comprise sets of instructions (codes) embodied on a computer-readable medium that directs a processor of a computing device 800 to perform corresponding actions. The instructions may be configured to run in sequential order, in parallel (such as under different processing threads), or in a combination thereof. After loading a code module 810 on a general-purpose computer system, the general-purpose computer is transformed into a special purpose computer system.

Computer programs incorporating various features described herein (e.g., in one or more code modules 810) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 804 can also store information useful for establishing network connections using the communication interface 808.

User interface 806 can include input devices (e.g., touch pad, touch screen, scroll wheel, click wheel, dial, button, switch, keypad, microphone, camera(s) for detecting gestures, etc.), as well as output devices (e.g., video screen, indicator lights, speakers, headphone jacks, virtual—or augmented-reality display, etc.), together with supporting electronics (e.g., digital-to-analog or analog-to-digital converters, signal processors, etc.). A user can operate input devices of user interface 806 to invoke the functionality of computing device 800 and can view and/or hear output from computing device 800 via output devices of user interface 806. For some embodiments, the user interface 806 might not be present (e.g., for a process using an ASIC).

Processing subsystem 802 can be implemented as one or more processors (e.g., integrated circuits, one or more single-core or multi-core microprocessors, microcontrollers, central processing unit, graphics processing unit, etc.). In operation, processing subsystem 802 can control the operation of computing device 800. In some embodiments, processing subsystem 802 can execute a variety of programs in response to program code and can maintain multiple concurrently executing programs or processes. At a given time, some or all of a program code to be executed can reside in processing subsystem 802 and/or in storage media, such as storage subsystem 804. Through programming, processing subsystem 802 can provide various functionality for computing device 800. Processing subsystem 802 can also execute other programs to control other functions of computing device 800, including programs that may be stored in storage subsystem 804.

Communication interface 808 can provide voice and/or data communication capability for computing device 800. In some embodiments, communication interface 808 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 808 can provide wired connectivity (e.g., universal serial bus, Ethernet, universal asynchronous receiver/transmitter, etc.) in addition to, or in lieu of, a wireless interface. Communication interface 808 can be implemented using a combination of hardware (e.g., driver circuits, antennas, modulators/demodulators, encoders/decoders, and other analog and/or digital signal processing circuits) and software components. In some embodiments, communication interface 808 can support multiple communication channels concurrently. In some embodiments, the communication interface 808 is not used.

It will be appreciated that computing device 800 is illustrative and that variations and modifications are possible. A computing device can have various functionality not specifically described (e.g., voice communication via cellular telephone networks) and can include components appropriate to such functionality.

Further, while the computing device 800 is described with reference to particular blocks, it is to be understood that these blocks are defined for convenience of description and are not intended to imply a particular physical arrangement of component parts. For example, the processing subsystem 802, the storage subsystem 804, the user interface 806, and/or the communication interface 808 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 800.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may refer to specific hardware and software components, those skilled in the art will appreciate that different combinations of hardware and/or software components may also be used and that particular operations described as being implemented in hardware might be implemented in software or vice versa.

Embodiments and examples were chosen and described to explain the principles of the invention and practical applications to thereby enable others skilled in the art to best utilize the invention in various embodiments and with various modifications as are suited to the particular use contemplated. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner.

Specific details are given in the description to provide a thorough understanding of exemplary configurations including implementations. However, configurations may be practiced without these specific details. For example, well-known circuits, processes, algorithms, structures, and techniques have been shown without unnecessary detail to avoid obscuring the configurations. This description provides example configurations only and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, steps may be undertaken before, during, or after the above elements are considered. Accordingly, the above description does not bind the scope of the claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. Additionally, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A system, for power savings in an extended-reality device, comprising:
    a head-mounted device comprising:
        a display; and
        an eye-tracking system; and
    one or more memory devices comprising instructions that, when executed by one or more processors, causes the one or more processors to perform steps comprising:
        rendering a video stream on the display;
        tracking an eye of a user observing the display;
        ascertaining a gaze direction of the eye, based on the tracking the eye;
        calculating a foveal region of the display, based on ascertaining the gaze direction in relation to the display; and
        modulating color hues of the video stream for pixels of the display outside the foveal region, to reduce a power consumption of the display, based on:
            a computational model of human color discrimination; and
            a power model that correlates power consumption with pixel color.

2. The system of claim 1, wherein the instructions, when executed, further cause the one or more processors to modulate intensity of the display outside the foveal region to further reduce the power consumption of the display.

3. The system of claim 1, wherein modulating colors green shifts light for a plurality of pixels.

4. The system of claim 1, wherein modulating color hues uses a constrained convex optimization that reduces display power while ensuring color hues are within a human discrimination threshold of the computational model of human color discrimination.

5. The system of claim 1, wherein hues of pixels within a 10-degree cone centered on the gaze direction are not modulated.

6. A method, for power savings in an extended-reality device, comprising:
    rendering a video stream on a display;
    tracking an eye of a user observing the display;
    ascertaining a gaze direction of the eye, based on the tracking the eye;
    calculating a foveal region of the display, based on ascertaining the gaze direction in relation to the display;
    modulating color hues of the video stream for pixels of the display outside the foveal region, to reduce a power consumption of the display, based on:
        a computational model of human color discrimination; and
        a power model that correlates power consumption with pixel color.

7. The method of claim 6, wherein modulating color hues is performed in real time based on learned data sets.

8. The method of claim 6, wherein modulating color hues is based on a power optimization routing using an intermediate color space that is a linear transformation of LMS color space.

9. The method of claim 6, wherein modulating colors red shifts light for a plurality of pixels.

10. The method of claim 6, wherein modulating color hues uses a constrained convex optimization that reduces display power while ensuring color hues are within a human discrimination threshold of the computational model of human color discrimination.

11. The method of claim 6, wherein hues of pixels within a 5-degree cone centered on the gaze direction are not modulated.

12. A memory device comprising instructions that, when executed by one or more processors, cause the one or more processors to perform steps comprising:
rendering a video stream on a display;
receiving a gaze direction of an eye of a user observing the display based on tracking the eye of the user;
calculating a foveal region of the display, based on the gaze direction in relation to the display;
modulating color hues of the video stream for pixels of the display outside the foveal region, to reduce a power consumption of the display, based on:
a computational model of human color discrimination; and
a power model that correlates power consumption with pixel color.

13. The memory device of claim 12, wherein the instructions, when executed, further cause the one or more processors to modulate intensity of the display outside the foveal region to further reduce the power consumption of the display.

14. The memory device of claim 12, wherein the modulating color hues is performed in real time based on learned data sets.

15. The memory device of claim 12, wherein color hues are modulated based on reference colors of pixels.

16. The memory device of claim 12, wherein the modulating color hues is based on a power optimization routing using an intermediate color space that is a linear transformation of LMS color space.

17. The memory device of claim 12, wherein the modulating color hues green shifts light for a plurality of pixels.

18. The memory device of claim 12, wherein the modulating color hues uses a constrained convex optimization that reduces display power while ensuring color hues are within a human discrimination threshold of the computational model of human color discrimination.

19. The memory device of claim 12, wherein hues of pixels within a 10-degree cone centered on the gaze direction are not modulated.

20. The memory device of claim 12, wherein hues of pixels outside 35 degrees of the gaze direction are modulated similarly as pixels at 35 degrees.

* * * * *